7484X
(New Drawing made from Model Mar. 5. 1870.)
George Page.
Mortising Machine.
Pat^d^ Mar. 13. 1833.
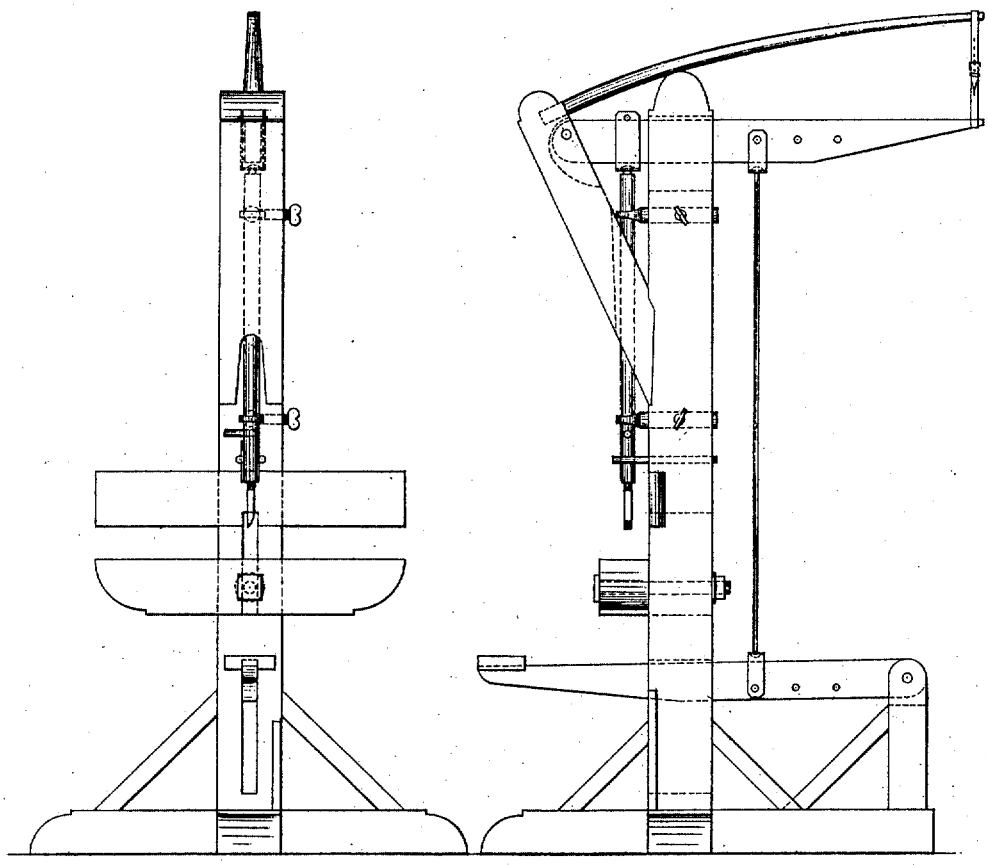
N. PETERS, PHOTO-LITHOGRAPHER, WASHINGTON, D. C.

7484X  Mar. 13. 1833  March 13, 1833
301

George Page of Keene New Hampshire
Letters Patent

The Schedule referred to in these Letters Patent and making part of the same containing a description in the words of the said George Page himself of his improvement in the machine for mortising in wood.

To all persons to whom these presents shall come. Be it known that I George Page of Keene in the County of Cheshire and State of New Hampshire have invented and made a new and useful improvement in the method of mortising by a machine. which machine is described as follows viz
The bottom consists of two pieces of [illegible] [illegible] four inches wide, three inches thick. one piece three feet long. the other piece three feet and four inches. These are locked together crossing each other at right angles. the place of intersection in the shortest piece being at equal distances from each ~~each~~ end. and in the longest piece about two feet from one end, the short end is at the front of the machine. At the place of intersection a mortise is made, into which by a tenon is fixed an upright post four inches square and seven feet high from the bottom of the sills. This post is kept fast and supported by four braces from the sills. Beginning at three inches from the top of the sills a mortise is made in the [illegible] of the longest sill. through this post one inch wide and eleven inches long. Into the longest end of the long sill is fixed by a mortise and tenon, an upright post four inches wide two inches thick and seventeen inches high from the bottom of the sill. In the top of this post one end of a lever is inserted a pivot passing through the post and end of the lever. which lever is three feet long, one inch thick and three inches wide. and passes through the mortise in the post and has upon the other end a piece of timber four inches square and one inch thick, upon which to place the foot six inches above the mortise in the post another mortise is made through it in the same direction. five eighths of an inch wide and fifteen inches long. Through this mortise passes an iron moveable bolt eight inches long,

74844X with a screw, collar and nut, on one end, the other end passing through a piece of timber called the rest. This rest is two feet three inches long and four inches square. The bolt aforesaid which is five eighths of an inch in diameter passes through the middle of the rest and is made fast by a square head. On the back side of this rest are firmly secured two pieces of board four inches apart, the interval being in the middle of the rest. By means of the said bolt, screw and nut the rest may be made fast at any desirable height, and the two pieces of board, one on each side of the post, assist in keeping it firm. A board three and a half inches wide of the same length as the rest is let into the post even with the face of it, crossing it the upper edge two inches above the top of the mortise, the lower edge of course one and a half inch below, the board being cut away where it covers the mortise. One inch above the top of the board on one side of the post a cleat one inch square and about three inches long is screwed firmly to the prevent the timber to be worked from riding by the operation of the machine. Four feet three inches from the bottom of the sill a brace of the size of the post and three feet long is inserted into the post inclining forwards at an angle of sixty two degrees from a horizontal line. This brace is fastened to the post by a short girt four inches square seventeen inches from the toe of the brace to the top of the girt. Through the brace and the girt, mortises are made next to the post three inches long measuring horizontally. Beginning five feet nine inches from the bottom of the sill, or one inch above the top of the girt, another mortise is made through the post in the same direction as the others one inch wide and eight inches long. Through this mortise passes a lever about two feet nine inches long three inches wide and one inch thick, it is inserted in the brace and fastened by a pin or pivot. From this lever to the lever first described passes a rod with a clevis on each end, by which clevis the two ends of the rod are attached to the two levers, several holes are made through each lever. The hole nearest the post being one & a half inch from the post and the others being one and a half inch from each other. These holes are to receive the pins passing through

7484X holes in the ends of the levers and by attaching the ends of the rod to
different places on the levers, different purchases and motions may
be obtained. Three inches and a half below the top of the brace
a mortise is made through it at right angles one and a half inch
square into this mortise is inserted a spring made of hickory, ash or
other elastic timber three feet long from the brace. The end of this spring
and the end of the upper lever is connected by a leather strap hav-
ing a buckle by which it may be tightened or loosened at pleasure.
About three feet four inches above the top of the sills or about four inch
es above the board placed across the post as above described on the
right hand side of the post is made a groove about one and a half inch
wide and half an inch deep — from the middle of this groove another
is made into the front side of the post half an inch wide and one
inch deep, and extending to within one inch of the other or left
side of the post. The groove receives a cast iron box thus described;
The side which when placed is the right side, is about one and a
half inch wide, and five and a half inches long, and the thickness of
the side is about half an inch. This side fits into the groove on the side
of the post. From one end, the front end of this iron proceeds a piece
half an inch thick, and two and a half inches square which is mor-
tised in the groove on the front side of the post. Through the centre of
this square is a round hole about one inch in diameter, the whole of
which when the box is placed, appears in sight. Back of this square
through the side afore described, in the middle thereof is a mortise
two inches long and three eighths of an inch wide. Through this
mortise and through the post passes a bolt having a head on one
end and a screw and nut on the other, by means of which the
cast iron box may be secured, and moved backwards or forwards
a little at pleasure. Two feet above this box another similar one
is placed in the same manner. The part of the machine next to
be described is a round iron slide or rod two feet six inches long
and one inch in diameter — on one end of this slide, the upper end
a strap of iron in the form of a clevis is attached by means of a screw the head of which is within the clevis and the screw enters the
end of the slide passing through a hole in the bend of the clevis. The
hole in the clevis is made so large that the rod may be turned.
This clevis passes up on each side of the upper lever near the post, and is
secured by a cross pin. About four inches from the other end
the lower end of the slide, a thumb piece is attached to it by
which the slide may be turned. Half an inch above the thumb
piece, a hole is made through the slide of the size of a large wire;
four inches above this hole another, and into these holes holes are in
serted a wire bent at right angles. so that the wire lays along the
side of the slide - into the lower end of the slide is made a socket
two inches deep to receive the shank of a chisel. At the extrem
ity of the socket or top of the chisel when inserted a hole is made
through the slide for the purpose of driving out the chisel.
This slide passes through the round hole in the upper cast iron
box, through the mortise in the girt above described, through the
mortise in the brace and through the hole in the lower cast iron
box. On each side of the slide so placed about two inches below the
brace two small steel springs are inserted in holes made through
the post. These springs project in front and on the inner side of each
are small fluted groves made to receive the wire attached to the
slide - by means of the thumb piece the slide may be turned half
round, and the wire falling into the groove of one or the other spring
fastens it. The socket in the lower end of the slide to be round to
receive the round shank of the chisel. The chisel to be of the duck bill
form after the fashion of the chisels used for mortising, and be four
inches in length exclusive of the shank. By turning the chisel in
the socket flatwise or face to the front to be used for cutting dove-
tail mortises, and side wise to the front in cutting mortises for doors
sash, cabinet work window blinds &c. In the same socket by
taking out the chisel after cutting the mortise an iron driver with
a round shank is to be inserted to drive or force the chips out of
the mortise. The driver to be made of the same length of the chisel about as thick as the chisel is wide, and about half an inch in width
to be flat upon the lower end.
Operation of the machine. The moveable rest is first adjusted
to the dimension of the timber or wood to be mortised which is easi-
ly done, the boards on each side of the posts keeping it at right an-
gles with the post. The rest is made fast by the screw and nut at the
proper distance to admit the timber or wood to be mortised between
the upper side of the rest and the lower end of the chisel upon the
post. To make the common mortise the wood to be mortised is,
placed upon the rest and the chisel set to cut either right or
left head of the mortise, the wire upon the side of the slide in the
groove of one of the steel springs guiding the slide in the operation
of the machine. The foot is applied to the lower lever and pressed
down, the lower lever and upper ~~lever~~ being connected by the rod and
clevices, as the lower lever is pressed down it brings down
the upper lever to which the slide and chisel are attached; and
drives the chisel into the wood in proportion to the force applied
by the foot of the operator; As the weight of the foot is withdrawn
the spring at the top of the machine which is attached to the upper
lever by the leather strap recovers by its elasticity and withdraws
the chisel from the wood. The wood or timber is then moved by the
hand of the operator and the foot applied as before and so un
til one head of the mortise is finished. By means of the thumb
piece the slide is then turned half round and the wire upon
the slide set in the groove in the other steel spring and the
other head of the mortise made by a similar operation.
To make the dovetail mortise the chisel is turned in the socket
so that it is flatwise or [illegible] to the front, and the timber or board
having the dovetail first sawed is presented endwise to the
machine and the power is applied, and the operation carried
on as before until the mortise is cut out, the slide not requiring
to be turned in cutting this kind of mortise. To use the driver
the chisel is taken from the socket and the driver inserted, the

[illegible] 7484X rod is let down and a block placed upon the rod with a hole mor-
tised in the block to let the chips fall through. The driver is
forced through the mortise in the same manner as the chisel
is forced into the wood. My improvement consists in the ro-
tary motion of the slide, the wire guide, steel springs, and groove.
Also in the clevises and pins upon the two ends of the rod &
in the holes in the two levers, by means of which the power and
motion of the machine may be increased or diminished at the pleas-
ure of the operator. Also in the round socket in the slide, and
round shank of the chisel by which the dovetail mortise is cut.
And also by fixing to the machine a driver, by which the chips
are cleared from the mortise.

In testimony that the foregoing is a true specification of my
said improvement, as described I have hereunto set my hand
this twenty seventh day of February in the year of our Lord one
Thousand Eight hundred and thirty three.

Exd. Witnesses
W.C. James Wilson Jr.
Charles M. Russel

George Page (2506 words)

(Granted March 13. 1833)

[illegible]